United States Patent [19]

Smith et al.

[11] Patent Number: 4,692,074

[45] Date of Patent: Sep. 8, 1987

[54] TOOL COUPLING ARRANGEMENT FOR A TOOLING ASSEMBLY

[75] Inventors: Michael D. Smith, Troy; Daniel F. Dobat, Sterling Heights, both of Mich.

[73] Assignee: The Cross Company, Fraser, Mich.

[21] Appl. No.: 850,652

[22] Filed: Apr. 11, 1986

[51] Int. Cl.⁴ ............................................. B23B 31/26
[52] U.S. Cl. .................................... 409/233; 408/36; 408/42; 408/118; 409/231
[58] Field of Search ............ 408/36, 42, 125, 223–225, 408/83.5, 118, 191, 238, 239 R; 409/233, 231, 232, 234

[56] References Cited

U.S. PATENT DOCUMENTS

| | | | |
|---|---|---|---|
| 2,838,962 | 6/1958 | Curtis | 77/3 |
| 3,068,727 | 12/1962 | Wertman | 77/58 |
| 3,139,637 | 7/1964 | Mikenberg | 10/139 |
| 4,066,380 | 1/1978 | Beck | 408/125 |
| 4,154,555 | 5/1979 | Skrentner | 408/25 |
| 4,468,826 | 9/1984 | Moores | 7/158 |

Primary Examiner—Eugene F. Desmond
Assistant Examiner—Steven C. Bishop
Attorney, Agent, or Firm—R. J. Eifler; J. R. Benefiel

[57] ABSTRACT

A tool coupling arrangement is disclosed for a tooling assembly (10) adapted for automatic tool insertion into a spindle assembly (12), the tooling assembly (10) having an axially moveable element (20) for causing movement independently of the spindle assembly (12). In the particular disclosed applications, a pair of cutting tools (14, 16) are provided to simultaneously machine concentric features on a workpiece (8), disclosed as a valve stem guide bore (9) and valve seat (7) of an engine cylinder head. A first coupling arrangement secures this tooling assembly (10) after it is inserted within the spindle assembly (12), while a second coupling arrangement automatically couples the separately moveable element (20) to an inner draw bar (84) of the spindle assembly (12). The second coupling arrangement couples the inner draw bar (84) to the independently moveable element (20) by limited rotation thereof after limited axial advance to enable continued axial advancing of element (20) by movement of the inner draw bar (84), independently of the spindle assembly (12).

15 Claims, 7 Drawing Figures

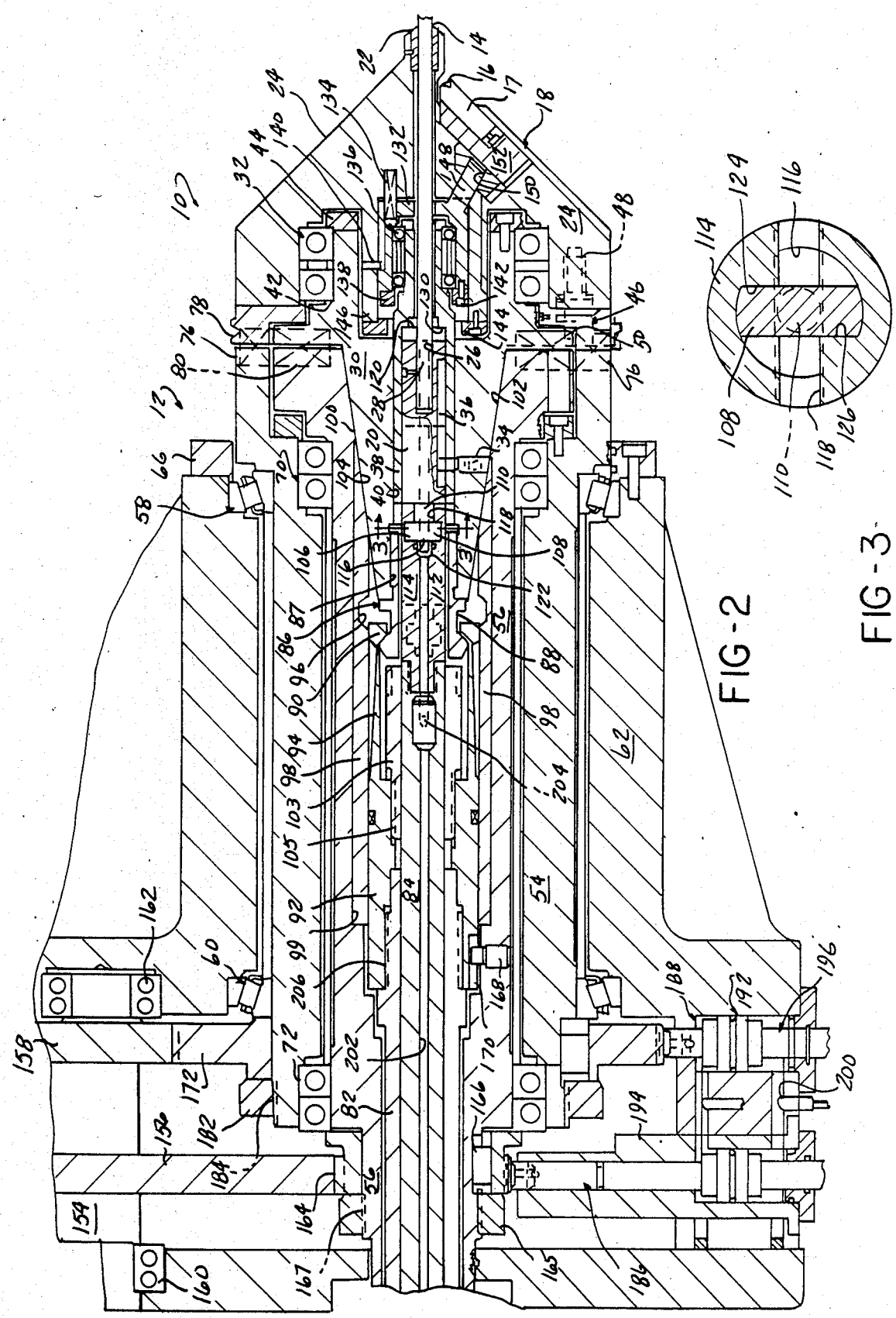

TOOL COUPLING ARRANGEMENT FOR A TOOLING ASSEMBLY

This invention concerns a tool coupling arrangement for tooling assemblies adapted to be inserted in a spindle assembly and, more particularly, a tool coupling arrangement for automatically coupling an independently moveable element included in the tool assembly to a draw bar included in the spindle assembly.

BACKGROUND

In certain machining applications, it is sometimes desirable to execute independent axial motions of elements in the tooling at a single station. For example, this is required to machine concentric features on a part, with separate independently advanced cutting tools located in the same station used to machine these features. This is done in the instance of machining valve stem guide bores and corresponding valve seats in engine cylinder head with separate cutting tools located in the same station.

This is advantageous to machine both the valve stem guide and the valve seat at a single station, so since the concentricity of the seat and bore may be more easily maintained, and this also reduces the number of separate machining stations required.

Arrangements are known in which a valve seat finishing tool and reamer are concentrically mounted at a single station, with the reamer axially advanced independently of the spindle assembly by which the tooling is rotated, and also rotated at a different speed than the valve seat finishing tool in order to maintain the valve stem guide bores.

This independent axial motion of the reamer has been accomplished by a draw bar mounted in the spindle assembly carrying a reamer holder.

There are a number of other applications requiring such independent motion of an element, some of which involve a plurality of motions of a single cutting tool. Examples of these instances are automatic tool wear compensation arrangements and other dual motions of a single tool driven by a single spindle.

There also presently is an increased need for so called "flexible" machining equipment in which the tooling of high production machines may be changed quickly, such as for conducting operations on differently configured parts. In conventional transfer machines, the tooling is dedicated to a specific part and the transfer line must be retooled by a rebuilding of the machine to be adapted to the manufacture of another part.

In "flexible" machining applications, automatic tool changers have heretofore been employed which allow an exchange of tooling assemblies automatically in a spindle assembly at a given machining station. However, heretofore no tooling coupling arrangement has been provided for a tooling assembly having a separately moveable element mounted therein, which must be connected to a separately moveable actuator member in the spindle assembly.

As, for example, to separately advance a reamer from a valve seat finishing tool both contained in the tooling assembly; to operate a plurality of motions of a single tool in the tooling assembly.

SUMMARY OF THE INVENTION

The invention is a tool coupling arrangement for a tooling assembly which includes an element which is mounted for axial movement, such as to be able to advance or otherwise actuate one or more cutting tools in the assembly independently of the spindle motion. The tool coupling arrangement is used with a tooling assembly adapted to be inserted into a spindle assembly and automatically coupled to the spindle assembly by a first coupling means comprised of an axially moved outer draw bar carried within the spindle assembly which causes the coupling of the tooling assembly to the spindle assembly.

An independently axially moveable actuator member comprised of an inner draw bar is also included in the spindle assembly and, according to the tool coupling arrangement according to the present invention, is automatically coupled to the independently moveable element of the tooling assembly by a second coupling means. The second coupling means in the specific embodiment disclosed is operated by a limited rotation of the inner draw bar and consequent interfitting of mating portions of the inner draw bar and moveable element to achieve coupling.

In the specifically described embodiments, the separately moveable element comprises a tool holder for a first cutting tool, with a second tool holder also carried in the tooling assembly. The cutting tool holders are each mounted to inner and outer tool bodies which are adapted to be rotated independently to allow differing rotative speeds of the respective cutting tools.

In the first described embodiment, inner and outer spindles are provided in the spindle assembly which are keyed to drive the inner and outer tool bodies upon insertion of the tool assembly into the spindle assembly.

In a second version, a single drive spindle is utilized, coupled to one of the tool bodies upon mounting of the tool mounting assembly into the spindle assembly, and gearing is interposed between the inner and outer tool bodies to produce a rotative drive therebetween.

The tool holder carried by the outer tool body is mounted on a slide inclined to produce both axial and radial movement of the cutting tool. The movement of the slide is produced by a predetermined axial advance of the moveable element acting through an interposed sleeve contacting the slide.

Accordingly, it is an advantage of the present invention that it provides a tool coupling arrangement for automatically coupling a tooling assembly in a spindle assembly previously inserted therein, which arrangement establishes coupling of a separately axially moveable element to an actuator member in the spindle assembly.

DETAILED DESCRIPTION OF THE INVENTION

FIG. 2 is a fragmentary view of a tool holder assembly and portions of the spindle assembly incorporating a tool mounting arrangement according to the present invention shown in partial section.

FIG. 3 is a view of the section 3—3 taken in FIG. 2.

It is to be understood that the tool coupling arrangement according to the present invention is contemplated for use with various known automatic tool changer arrangements. However, an automatic tool changer is not here described for the sake of clarity since these are well known in principle to those skilled in the art.

Figure 1:
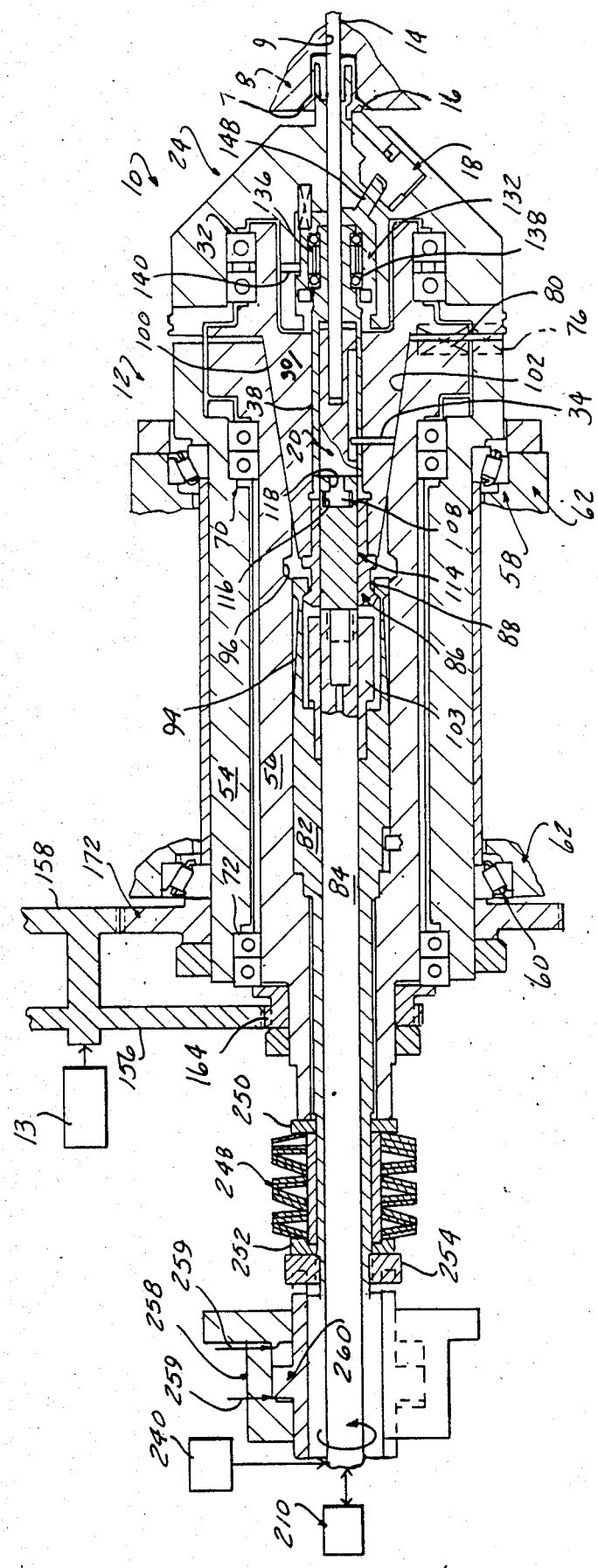
FIG. 1 is a simplified, partially sectional view of a tool holder and spindle assembly according to the present invention shown in position against a workpiece shown in phantom, with a schematic representation of associated actuation components.

FIG. 1 shows a tooling assembly 10 inserted and coupled to a spindle assembly 12, which supplies rotative power for driving a pair of cutting tools included in the tooling assembly comprising cutting tool 14 (shown as a reamer) and valve seat cutting tool 16, as for machining a valve stem bore 9 and valve seat 7 respectively of workpiece 8.

The tooling assembly 10 includes an inner tool body 30 and actuator sleeve 38 carrying a cutting tool holder 20 mounting cutting tool 14, which inner tool body 30 also is adapted to rotate the tool holder 20 via drive pin 34. The tooling assembly also includes an outer tool body 24 rotatably mounted on the inner tool body 30 by bearing set 32, the outer tool body 24 carrying and driving cutting tool holder 18 to also rotate valve seat cutting tool 16.

Inner and outer spindles 56, 54 are included in the spindle assembly 12, driven by means comprised of drive gears 164 and 156 and 172 and 158 respectively both rotated by rotary drive means 13. The inner spindle 56 drives inner tool body 30 through a drive key 80 and the outer spindle 54 drives outer tool body 24 by drive key 76. Cutting tools 14 and 16 are thus rotated at different speeds to perform the separate machining operations on the workpiece 8 described. Inner spindle 56 is mounted in bearing sets 70 and 72 while outer spindle 54 is mounted in thrust absorbing bearing sets 58 and 60 carried in stationary housing portions 62.

As noted, the tooling assembly 10 is adapted for automatic insertion into tapered bore 102 of the inner spindle 56 of the spindle assembly 12, as by a tool change mechanism (not shown) gripping peripheral groove 78 in the outer tool body 24.

To couple the tooling assembly 10 in the spindle assembly 12, an axially moveable outer draw bar 82, is mounted in the spindle assembly 12, which operates a first coupling means by its axial movement to couple the tooling assembly 10 to the spindle assembly 12.

The outer draw bar 82 is actuated to operate the first coupling means by being biased to the left by a Belleville spring set 248 acting on a stationary collar 250 and collar 252 bearing on threaded ring 254 received over the end of outer draw bar 82.

This moves collet spring fingers 94 out of recess 96 formed in inner spindle 56 and into engagement with end piece 86 of inner tool body 30 constituting in part the first coupling means drawing taper surface 100 into engagement with tapered bore 102 on inner spindle 56, and moving spring finger ends 90 into groove 88 to lock the inner tool body 30 to the inner spindle 56 and thereby couple the tooling assembly 10 to the spindle assembly 12.

To release tooling assembly 10 to change tooling, actuator means 258 comprised of a hydraulic cylinder is pressurized via lines 257 and venting of line 259 to cause piston 260 to bear on ring 254, overcoming Belleville spring set 248, moving outer draw bar 82 to the right where the attached release sleeve 103 contacts end piece 86 to release tooling assembly 10 for removal and insertion of a new tooling assembly 10.

According to the concept of the present invention, independent axial motion of one of the elements carried by tooling assembly 10, i.e., tool holder 20, is releasably connected by a second coupling means to an inner draw bar 84 carried by the spindle assembly 12. The inner draw bar 84 is mounted to be axially moveable in the spindle assembly 12, and is adapted to be stroked by actuator means 210 comprised of a hydraulic cylinder engaged at the left end. The inner draw bar carries an extension member 114 which is formed with a recess 116 and transverse slot 118.

Tool holder 20 is formed with an end piece 106 including a blade shaped tail 108 adapted to pass through slot 118 into circular recess 116 as the inner draw bar 84 moves to the right.

Rotary actuator means 240 is thereafter actuated to rotate inner draw bar 84 sufficiently to move tail 108 out of alignment with slot 118 so that tool holder 20 is coupled to move axially together with inner draw bar 84. Inner draw bar 84 is thereafter moved back to the left by actuator means 210 preparatory to the start of a machining cycle.

At the beginning of a machining cycle, the actuator means 210 causes axial movement of inner draw bar 84 and tool holder 20 to the right causing an actuator sleeve 38 to also be moved to the right, in turn moving a cam sleeve 132 rotatably supported on bearings 136 to the right.

Cam sleeve 132 is formed with a portion comprised of a tongue 148 protruding into a recess in tool holder 18, causing it to slide outwardly, traversing cutting tool 16 across the valve seat 7.

Thus, a tooling assembly 10 is provided having a capability for an independent axial actuation of cutting tools, while being adapted to be automatically changed to achieve the above recited advantages of the present invention.

FIG. 2 illustrates in detail the first embodiment of the tool coupling arrangement shown in FIG. 1, which includes the tooling assembly 10, and the spindle assembly 12. As described above, the tooling assembly 10 is adapted to be inserted within the spindle assembly 12, preferably by use of an automatic tool changing mechanism, the tooling assembly 10 having portions mating with corresponding portions in the spindle assembly 12.

The tooling assembly 10 includes the cutting tool 14, and valve seat finishing cutting tool 16, mounted for rotation about a common axis of rotation. The valve seat cutting tool 16 is mounted in a tool holder 18 while the cutting tool 14 is mounted in tool holder 20.

A front guide bushing 22 is provided, mounted in outer tool body 24, the outer tool body 24 serving to carry and mount the tool holder 18.

The shank of the cutting tool 14 is received into a bore 26 formed in holder 20, with a locking screw 28 tightened to retain the cutting tool 14 therein.

The tool holder 20 is in turn mounted within inner tool body 30, the outer tool body 24 rotatably mounted on the inner tool body 30 by means of bearing set 32.

Tool holder 20 is constrained to rotate with the inner tool body 30 by means of a drive pin 34 received within an elongated slot 36 machined into the outside diameter of the tool holder 20. The tool holder 20 also is received within interposed actuator sleeve 38, in turn received in a bore 40 formed in the inner tool body 30.

The inner tool body 30 and outer body 24 are axially located with respect to each other by means of a shoulder 42 and end cap 44, engaging either side of bearing set 32 as shown.

The tool bodies 24 and 30 are retained together as an assembly so as to prevent relative rotation therebetween whenever the tooling assembly 10 is not installed in a spindle assembly 12 in order to maintain the angular orientation of the inner and outer tool bodies 24 and 30. For this purpose, locking key 46 is provided, carried in a slot formed in outer tool body 24, the locking key 46 urged by means constituted by springs 48 towards the locking position, in which a locking portion 50 is received into a corresponding pocket on the inner tool body 30.

Each of the inner tool body 30 and outer tool body 24 are adapted to be rotated by drive means which in the embodiment of FIGS. 1 and 2, includes outer spindle 54 and inner spindle 56. Outer spindle 54, is mounted in bearing sets 58 and 60 received in suitable bores formed in housing portions 62 with a spacer sleeve 64 interposed therebetween and a ring 66 secured to the right hand end face of the housing portions 62.

The inner spindle 56 is mounted concentric thereto in bearing sets 70 and 72 formed in the outer spindle 54 received in bores in the outer spindle 54, at either end thereof, with a spacer sleeve 74 maintaining the axial separation therebetween.

The outer spindle 54 is coupled by means of a drive key 76 to the outer body 24 as indicated, which drive key 76 acts to engage the locking key 46, and forcing it to the right as viewed in FIG. 2, against the bias of the spring 48 to position the locking key 46 in the release position, thus allowing relative rotation between the outer tool body 24, and the inner tool body 30.

Outer tool body 24 is formed with peripheral groove 78 engageable during tool changing with an automatic tool changing gripper of well known design.

The inner tool body 30 is adapted to be rotated by the inner spindle 56 by means of a drive key 80 received within a corresponding recess extending into the left hand shoulder of inner body 30 upon insertion of the tooling assembly 10 into the spindle assembly 12.

Locking mechanisms are provided, for axially coupling the tooling assembly 10 within the spindle assembly 12, while allowing independent axial movement of the tool holder 20, as well as the separate actuation of tool holder 18. The locking mechanisms include outer draw bar 82 and inner draw bar 84.

The outer draw bar 82 is slideably received within a bore of the inner spindle 56, while the inner draw bar 84 is slideably received within the outer draw bar 82.

The outer draw bar 82 is also axially moveable and is adapted to be moved to the locking position shown, by Belleville spring set 248 as described, and axially moved to the right to the releasing position by means of the actuator means 258.

The releasable locking action produced by the outer draw bar 82 is achieved by an arrangement heretofore known in the context of conventional tool changing. The inner tool body 30 has secured on its left end an end piece 86, threadably received within bore 87, formed into the left end of the inner tool body 30. The end piece 86 is formed with a groove 88, configured to receive the spring finger ends 90 formed on a series of collet spring fingers 94 extending from a collet sleeve 92 with the outer draw bar 82 in the locking position. The collet spring fingers 94 are released by movement of outer draw bar 82 threaded thereto at 206 to the left position.

The spring finger ends 90 are received within a recess 96 formed in sleeve 98 upon being moved to be aligned therewith by the actuator means, allowing the collet spring fingers 94 to expand to the position with the spring finger ends 90 disposed therein. With collet spring fingers 94 in the expanded position, the inner tool body 30 is able to pass into and out of sleeve 98 carried in bore 99 of the outer spindle 54.

The inner tool body 30 is formed with taper surface 100, which is received in a corresponding tapered bore 102, formed in the inner spindle 56 and tapered bore 104, in the sleeve 98 to be frictionally locked thereto.

A release sleeve 103 is threaded at 105 to collet sleeve 92, adapted to contact the end piece 86 by movement of the outer draw bar 82 to the right, releasing the taper surface 100 from tapered bores 102 and 104.

Upon reversal of the actuating means and the movement of the outer draw bar 82 to the left, to the position shown in FIG. 2, an axial securement of the tooling assembly 10 in the spindle assembly 12 is thus provided. This securement is accomplished through the inner tool body 30 acting through the bearing set 32, shoulder 42, and end cap 44, to also axially secure the outer tool body 24 within the tool spindle assembly 12, and thus, providing axial securement for the tooling assembly 10 as a whole therein.

The inner draw bar 84 is adapted to engage the tool holder 20 by portions adapted to be interfit after a predetermined axial travel of the inner draw bar 84 at the beginning of a tool change cycle sufficient to drive actuator sleeve 38 to the right to bottom out. The tool holder interfitting portions are formed on an end piece 106 of the tool holder 20, including blade shaped tail 108, an intermediate stub shaft 110, and a reduced diameter pilot 112.

The inner draw bar 84 includes an extension member 114 having a circular recess 116 formed therein, a transverse slot 118 extending into the circular recess 116 from the end face 120 of the extension member 114. A bore 122 is adapted to receive the pilot 112 formed on the end piece 106 of tool holder 20.

FIG. 3 illustrates that the tail 108 aligned with the slot 118, the tail 108 may pass into slot 118 and thence into recess 116. Upon limited relative rotation of the inner draw bar 84, the end piece 106 is rotated to the position shown in FIG. 2, in which the tail 108 has been rotated out of alignment with slot 118, and against surfaces 124 and 126 to provide an axial securement together of the tool holder 20 with the inner draw bar 84.

Thus, the tool holder 20 may be independently axially advanced within the inner tool body 30 by the inner draw bar 84.

After coupling, the inner draw bar 84 is returned to the left preparatory to the beginning of a machining cycle, springs 134 returning the cam sleeve 132, bearing 139 and sleeve also to the left position with a gap between end face 120 of tool holder 20 and inner shoulder 130 of actuator sleeve 38. Upon initiation of a machining cycle, inner draw bar 84 is actuated to be moved to the right. After a predetermined extent of axial advance, the tool holder 20, end face 120 engages shoulder 130 on the actuator sleeve 38 also to be axially advanced to the right as shown in FIG. 2.

This causes movement to the right of a cam sleeve 132 against the bias of springs 134. Cam sleeve 132 is rotatably supported by bearings 136 and 138 on the outside diameter of the actuating sleeve 38, which in turn is caused to rotate with the outer tool body 24 by means of drive pin 140. End cap 142 and 144 secures the assembly together within the hub 146 formed on the outer tool body 24.

The actuating member cam sleeve 132 is provided with an axially and radially extending tongue 148 which is received within a pocket 150 formed in an inclined tool slide 152 received within a corresponding slot in outer tool body 24, inclined tool slide 152 comprising the tool holder 18.

Accordingly, upon continued axial advance of the inner draw bar 84, the actuator sleeve 38 causes axial movement to the right of the cam sleeve 132 and tongue 148, which causes the inclined tool slide 152 to be moved radially inward and axially to the right as viewed in FIG. 2, which generates the appropriate travel of the cutting tool 16 for the particular valve seat geometry.

Each of the inner spindle 56 and outer spindle 54 are adapted to be rotated at different speeds during a machining cycle, such that the cutting tools mounted thereon be driven at different rotative speeds. This may be accomplished by a drive means including a drive shaft 154 adapted to be rotated as by an electric motor (not shown), drive shaft 154 in turn having a pair of drive gears 156 and 158 mounted thereon and rotatably supported in spaced bearings 160 and 162, mounted in housing portions 62.

The large diameter first drive gear 156 is in engagement with a drive gear 164, keyed at 166 to the inner spindle 56, the inner spindle 56 also provided with a drive pin 168 engaging a slot 170 on the collet sleeve 92 to insure rotation together of the inner spindle and the collet sleeve 92, as well as the inner tool body 30.

The outer spindle 54 is driven at a slower speed, by means of the smaller diameter drive gear 158 in engagement with a larger diameter gear 172, keyed at 180 to the outer spindle 54 and retained thereon with ring 182, threadably engaged at 184 with the end of the outer spindle 54.

The drive gear 164 is retained by means of ring 165 threadably engaged at 167 to the end of the inner spindle 56.

In order to prevent free rotation of the inner spindle 56 and outer spindle 54 between machining cycles, stops are provided, including a shot pin 186 engageable with drive gear 164, and shot pin 188 engageable with gear 172, which may be operated by integral pistons 190 and 192, respectively slideable in cylinders 194 and 196, adapted to be supplied with hydraulic fluid under pressure from valving and control system (not shown) via passages 198 and 200, to allow two way operation thereof.

Locking of the inner and outer spindles 56, 54 insures that the proper angular orientation of the attached parts will be maintained during tool change cycles.

The inner draw bar 84 is provided with a central passage 202 for a supply of coolant with a check valve 204 provided, insuring that loss of coolant will not occur upon removal of the tooling assembly 10, as will be understood by those skilled in the art.

Figure 4:
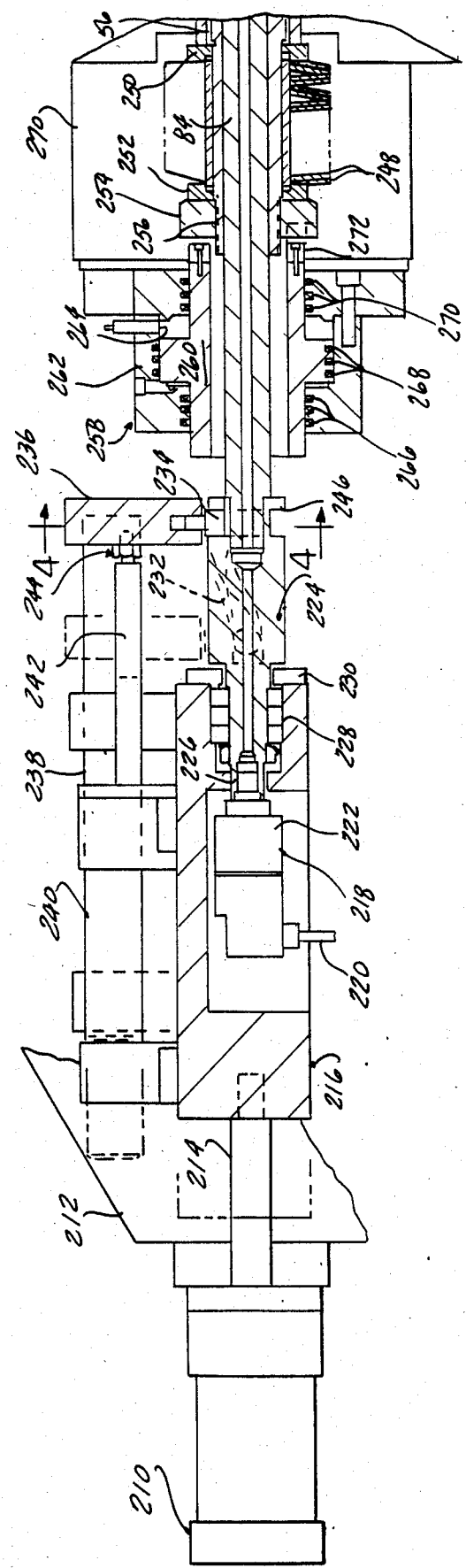
FIG. 4 is a partially sectional view of the actuator portions connected to the tool mounting arrangement shown in FIGS. 1 and 2.
Figure 5:
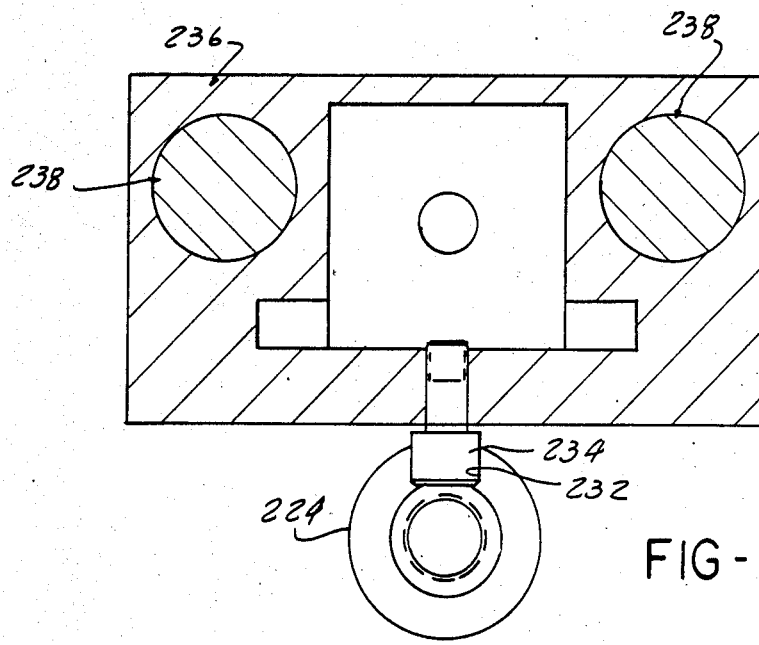
FIG. 5 is a view of the section 5—5 taken in FIG. 4.

FIG. 4 depicts the actuating means for producing axial movement of the inner draw bar 84 and the outer draw bar 82, as well as providing the limited axial rotation of the inner draw bar 84 needed to produce a locking of the interfitting portions of the tool holder 20 and the inner draw bar extension member 114.

A first actuator means 210 is mounted to a housing structure 212, and has an actuating rod 214 attached to a clevis member 216, in turn mounting a rotary coolant coupling 218, of a type well known to those skilled in the art, and adapted to receive a supply of coolant via connection 220, and allow flow to a rotary member 222 without loss of fluid.

The rotary member 222 is attached to a rotary cam sleeve 224 by means of a threaded connection 226. A rotary bearing set 228 provides support of the rotary cam sleeve 224 at the right hand end of the clevis member 216 as shown in FIG. 4.

A retainer ring 230 retains the assembly therein, and thus actuation of the actuator means 210 by hydraulic valving (not shown) can create axial travel of the attached inner draw bar 84.

The rotary cam sleeve 224 is provided with a cam groove 232 receiving a cam pin 234 mounted in an end plate 236, moveable on a pair of guide bars 238. The end plate 236 is moveable axially by means of the actuator means 240 comprised of a hydraulic cylinder having an operating rod 242 secured to the end plate 236 at 244.

Stroking of the actuator means 240, and axial movement of the cam pin 234 causes a limited rotation of the cam sleeve 224 and attached inner draw bar 84. Continued movement of end plate 236 locates the cam pin 234 in the groove 246, so that rotation of the inner draw bar 84 is accommodated.

The outer draw bar 82 is urged to the right as viewed in FIGS. 2 and 4 by means of a Belleville spring set 248 acting on collars 250 and 252, collar 250 providing a reaction point by being mounted against inner spindle 56, while collar 252 bears against a ring 254 threaded at 256 to the left hand end of outer draw bar 82.

Actuator means 258 is provided including a piston 260 received within a cylinder housing 262, defining a cylinder bore 264, with seals 266, 268 and 270 provided.

The housing 262 is mounted to a housing 270, piston 260 is formed with an engagement ring 272 which is adapted to be advanced against ring 254 to compress the Belleville spring set 248 and relieve the pressure exerted thereby moving the outer draw bar 82 to the right as viewed in FIGS. 2 and 4, to allow removal of the tooling assembly 10 by release of the collet spring fingers 94 and spring finger ends 90.

Operation of the embodiment of FIGS. 1 through 4 is initiated upon insertion of the tooling assembly 10 within the spindle assembly 12, as by a suitable automatic change mechanism gripping the tooling assembly 10 by means of the peripheral groove 78, of inner tool body 30, and moving the inner tool body 30 within the tapered bores 102 and 104.

The end piece 86 is received within the expanded collet spring fingers 94 and spring finger ends 90, the actuator means 258 having been previously actuated to compress the Belleville spring set 248 to allow expansion of the collet spring fingers 94 into recess 96.

Upon reverse actuation of the actuator means 258 and movement of the outer draw bar to the left, the collet spring fingers 94 are cammed into the groove 88 on end piece 86 and the tooling assembly 10 to the left as viewed in FIG. 2, firmly seating the tapered bores 104 and 102 on the taper surface 100. At the same time, the drive keys 76 and 80 move into engagement with corresponding recesses on the first spindle 56 and outer spindle 54, and the inner tool body 30 and outer tool body 24, establishing a rotary driving connection.

The locking key 46 is moved out of engagement to thus unlock the inner tool body 30 and outer tool body 24 to allow relative rotation therebetween.

The actuator means 210 is activated to advance the inner draw bar 84, bringing the end piece 106 and end face 120 into engagement, with the tail 108 moving into the slot 118.

Upon bottoming movement of tail 108 into the circular recess 116, actuator means 240 is activated by suitable controls (not shown) advancing the end plate 236 and cam pin 234, causing a limited rotation of the inner draw bar 84, and rotating the extension member 114 to the locked position shown in FIG. 3.

The actuator means 210 is actuated to return the inner draw bar 84 to the left preparatory to the initiation of the machining cycle. At the start of the cycle, both the inner tool body 30 and the outer tool body 24 are rotatably driven to rotate the respective tool holders 20 and 18.

Cutting tool 14 is thus advanced axially to enable machining of the valve stem guide hole by actuator 210 acting through the inner draw bar 84. After a predetermined advance of the inner draw bar 84, the actuator sleeve 38 is contacted which causes axial movement of the cam sleeve 132 and tongue 148, causing the radial and axial traversing of the cutting tool 16, in order to finish machine the valve seat.

During a tool changing cycle, the sequence is then reversed to withdraw and release the various components, actuator means 258 being actuated to compress the Belleville spring set and cause releasing of the taper surfaces to allow removal of the tooling assembly 10 by the automatic tool changing mechanism (not shown).

As discussed above, the runout between the axis of rotation of a cutting tool 14 and the cutting tool 16, is critical for the particular valve seat and valve stem guide machining application.

It is advantageous, as will be appreciated by those skilled in the art, to minimize the number of bearings required in order to rotatably support the tool bodies 24 and 30 in order to minimize the aforementioned runout created by the two separate drive spindles according to the embodiment of FIGS. 1 and 2.

Figure 6:
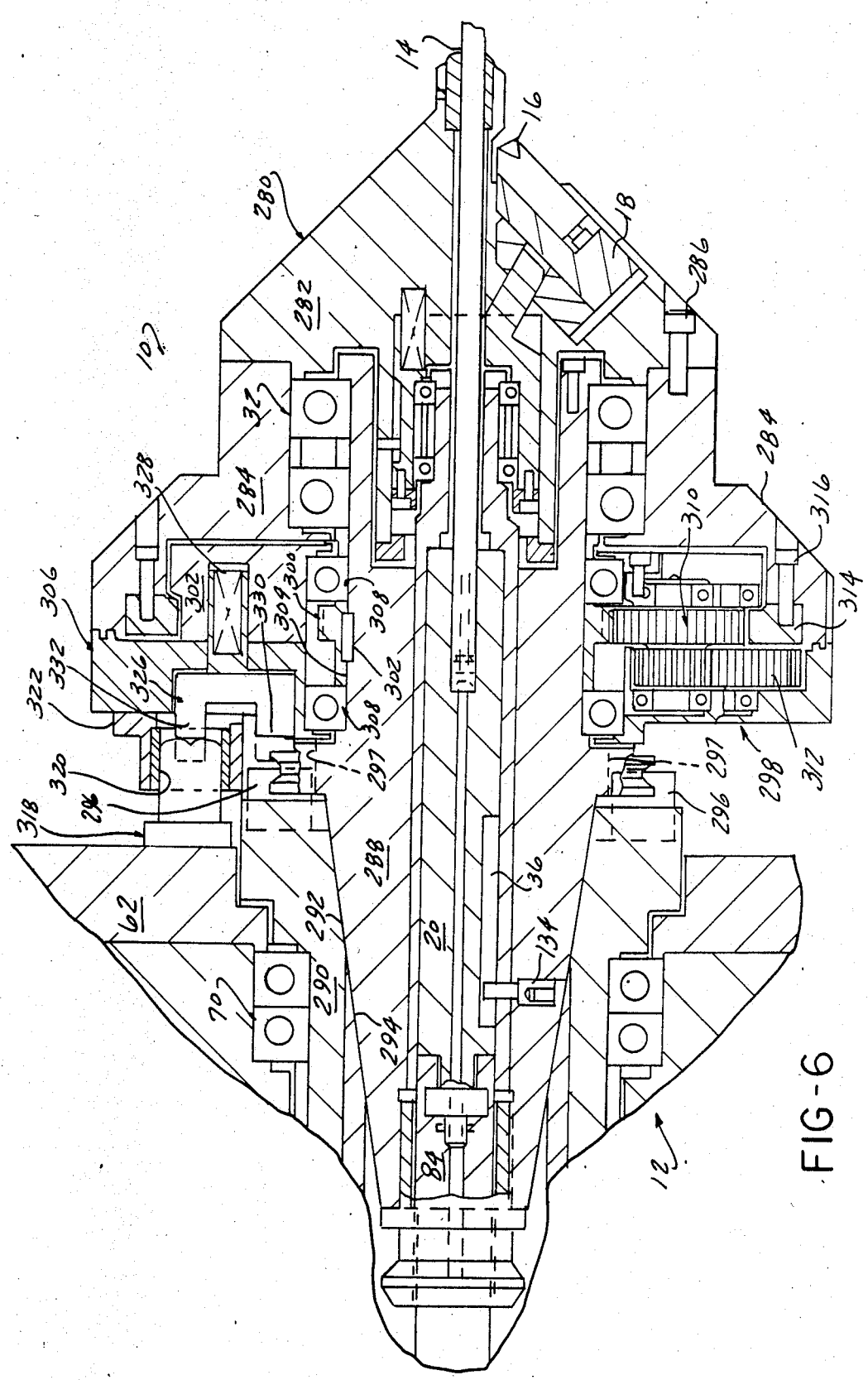
FIG. 6 is a fragmentary sectional view of an alternate embodiment of the mounting arrangement according to the present invention.

FIG. 6 depicts an arrangement for accomplishing this design objective by an alternative embodiment of the concept according to the present invention.

In this embodiment, the outer tool body 280 is constructed of two parts, a forward portion 282, and a rear portion 284 secured together by means of cap screws 286.

The inner tool body 288, as before, has the outer tool body 280 rotatably mounted thereon by means of a bearing set 32. However, a single spindle 290 is utilized to rotate both the outer tool body 280 and inner tool body 288, spindle 290 supported in bearing set 70, as before, mounted in the housing portions 62.

The spindle 290 is adapted to drive the inner tool body 288 through the taper surfaces 292 and 294 formed on the contacting portions of the inner tool body 288 and spindle 290. In addition, one or more drive keys 296 are mounted in the spindle 290 and are inserted into recesses in the inner tool body 288 to establish a positive driving connection therebetween.

A gearing drive 298 is interposed between the inner tool body 288 and the outer tool body 280 to produce a reduction drive therebetween. The gearing drive 298 includes a sun gear 300 keyed at 302 to the inner tool body 288 on a pilot section 304 of the inner tool body 288 supported in spaced bearings 308.

A carrier 306 rotatably supports stepped planet gears 310 and 312 intermediate the sun gear 300 and a ring gear 314.

Figure 7:
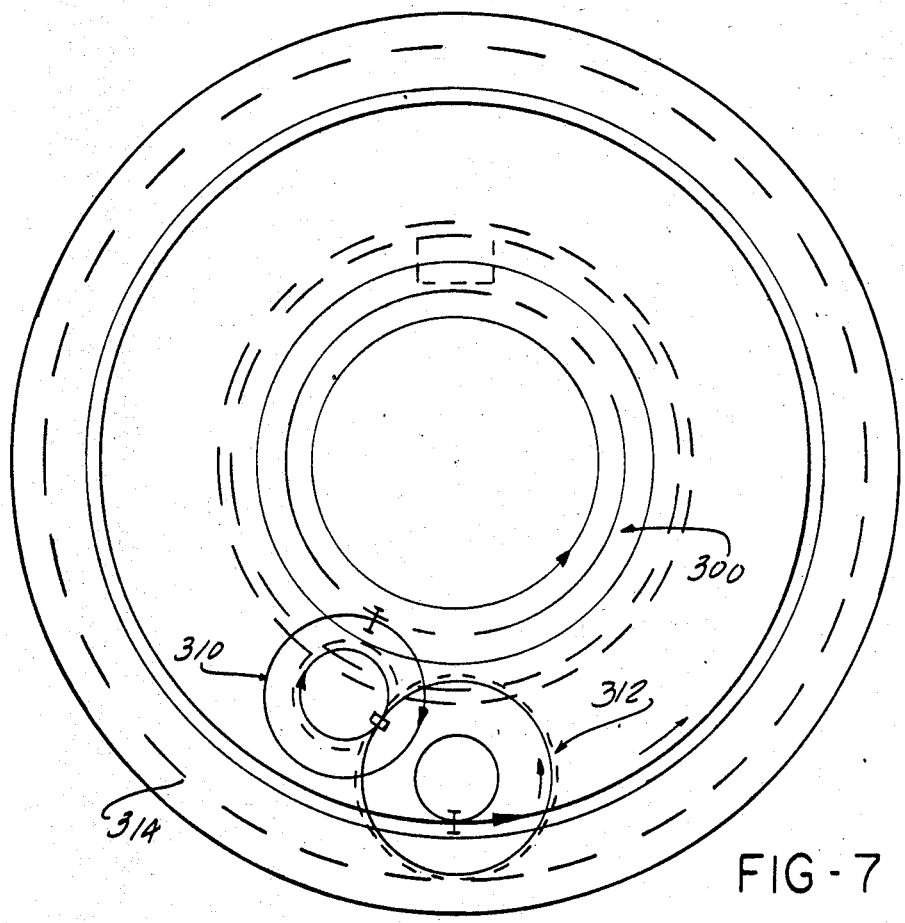
FIG. 7 is an endwise view of gearing incorporated in the embodiment shown in FIG. 6.

FIG. 7 shows that these planet gears 310 and 312 are intermeshed in order that that the same direction of rotation of ring gear 314 and sun gear 300 occurs.

Ring gear 314 is mounted within rear portion 284 of the outer tool body 280 by means of cap screws 316 as shown.

The carrier 306 is maintained in a stationary position in order to provide a reaction point, and enable the transmission of a rotary drive from the sun gear 300 to the ring gear 314.

This is accomplished by means of a stationary reaction pin 318 mounted to the housing portions 62 as shown, located and configured to be received in an anchor socket 320 formed in end plate 322 of the carrier 306 when the tooling assembly 10 is inserted into the spindle assembly 12. Upon rotation of the spindle 290, sun gear 300 is rotated and a geared reduction output to the ring gear 314 is accomplished by the interposed gearing consisting of the planetary gears 310 and 312, the carrier 306 maintained stationary by virtue of the seating of stationary reaction pin 318.

A locking fork 326 is also provided, urged by bias means constituted by springs 328 to the right as viewed in FIG. 6. Fork 326 is formed with a locking portion 330 adapted to be moved into a mating recess 297 on the inner tool body 288, thereby locking together the inner and outer tool bodies 288 and 280 to maintain the proper relationship, as in the above described embodiment of FIGS. 1 through 5.

The stationary reaction pin 318 engages an unlocking portion 332 of fork 326 upon insertion forcing the locking fork 326 to the right and to the disengaged position against the bias of the springs 328, such that, upon insertion, the respective inner and outer tool bodies are released and may rotate relative one another.

It can be seen that the design of this embodiment reduces the number of interposed bearing supports required and thus minimize runout due to inaccuracy in the rotary support for the inner tool body 288 and outer tool body 280.

It can be appreciated that the embodiment of FIGS. 6 and 7 will operate in similar fashion to the embodiment of FIGS. 1 through 5 also having inner and outer draw bars and other components operating in essentially the same fashion.

While the particular application described is for independent axial advance of cutting tools in a tooling assembly also including a valve seat finishing tool, other applications are also contemplated; such as tool wear compensation adjustment for a single tool driven by a single spindle assembly; and execution of other dual motions of a single cutting tool.

We claim:

1. A tool coupling arrangement of the type adapted to detachably couple a tooling assembly (10) insertable into a spindle assembly (12), said tooling assembly (10) having a plurality of elements, at least one of said elements (20) axially moveable independently of the other elements of said tooling assembly (10);

drive means (54, 56, 156, 164, 158) for rotating each of said elements about aligned axes of rotation;

an inner draw bar (84);
an outer draw bar (82);
each of said inner and outer draw bars (84, 82) mounted in said spindle assembly (12) for independent axial movement therein;
actuator means (210, 258) for axially moving said inner and outer draw bars (84, 82) independently in said spindle assembly (12);
first coupling means (30, 86, 92) operable by axial movement of said outer draw bar (82) to couple said tooling assembly (10) to said spindle assembly (12), characterized by:
second coupling means (116, 108, 240, 224) operable upon limited axial advance of said inner draw bar (84) to couple said independently moveable element (2) of said tooling assembly (10) to said inner draw bar (84) for axial movement together therewith.

2. The tool coupling arrangement according to claim 1 wherein said second coupling means comprises means (240, 224, 232, 234) for causing limited rotation of said inner draw bar (84) after said limited axial advance of said inner draw bar (84); and also includes mating portions (108, 116, 118,) of said inner draw bar (84) and said independently moveable element (20) of said tooling assembly, axially coupling said inner draw bar (84) and said element (20) upon said limited rotation of said inner draw bar (84).

3. The tool coupling arrangement according to claim 2 wherein said mating portions comprise a slot (118) and tail (108) said slot (118) extending into a partially circular recess (116) into which said tail (108) is moved by said inner draw bar (84) to establish said axial coupling.

4. The tool coupling arrangement according to claim 2 wherein said means (240, 224) for causing limited rotation of said inner draw bar includes a cam pin (234) and a cam track (232) drivingly engaged with said inner draw bar (84) to cause rotation thereof upon axial advance of said inner draw bar and actuator means (240) for axially advancing said cam pin (234).

5. The tool coupling arrangement according to claim 1 wherein said tooling assembly (10) includes an inner tool body (30) and an outer tool body (24) rotatably mounted thereon, each of said inner and outer tool bodies (30, 24) carrying a respective tool holder (20, 18) to be rotated therewith, one of said tool holders (20) comprising said independently moveable element, said drive means including means (56, 54, 156, 164, 158) for independently rotating each of said inner and outer tool bodies.

6. The tool coupling arrangement according to claim 5 wherein said drive means comprises an inner spindle (56) and an outer spindle (54) included in said spindle assembly (12); means (76, 80) rotatably coupling said inner spindle (56) and outer spindle (54) to said inner and outer tool bodies (30, 24) upon insertion of said tooling assembly (10) into said spindle assembly (12) so as to rotatably connect said inner spindle (56) to said inner tool body (30) and said outer spindle (54) to said outer tool body (24), and further including means (154, 156, 164, 158, 172) for rotating each of said inner and outer spindles (56, 54).

7. The tool coupling arrangement according to claim 6 wherein said means coupling said outer spindle (54) to said outer body (24) comprises a drive key (76) interengaging said outer spindle (54) and outer body (24) upon insertion of said tooling assembly (10) into said spindle assembly (12).

8. The tool coupling arrangement according to claim 7 further including a locking key (46) moveable to a locking position locking said inner and outer tool bodies (30, 24) together and means (48) biasing said locking key (46) into said locking position, said locking key (46) engaged by said drive key (76) to move to disengage said locking key (46) upon insertion of said tooling assembly (10) into said spindle assembly (12).

9. The tool coupling arrangement according to claim 6 further including shot pin means (186, 188) selectively operated for locking said inner and said outer spindles (56, 54) against rotation.

10. The tool coupling arrangement according to claim 5 wherein said outer tool body (24) carries an inclined tool slide (152) comprising one of said tool holders (18), said inclined tool slide (152) mounted for combined axial and radial motion thereon, and further including a cam sleeve (132) having a portion (148) engaged with said inclined tool slide (152) and moveable axially by axial advance of said inner draw bar (84) after said inner draw bar (84) has been advanced axially a predetermined distance.

11. The tool coupling arrangement according to claim 10 wherein said cam sleeve (132) comprises a cam sleeve (132) having a radially and axially projecting tongue (148) received within a correspondingly shaped pocket (150) on said inclined tool slide (152) and further including an actuator sleeve (38) positioned against said cam sleeve (132) and engaged by said inner draw bar (84) upon said continued axial advance of said inner draw bar (84).

12. The tool coupling arrangement according to claim 5 further including a gearing drive (298) interposed between said inner and outer tool bodies (288, 280) to produce a rotation of one of said tool bodies (280) at a different rotative speed by rotation of the other of said tool bodies (288), and wherein said drive means includes a spindle (290) rotatably coupled to said one of said tool bodies (280) upon insertion of said tooling assembly (10) into said spindle assembly (12).

13. The tool coupling arrangement according to claim 12 wherein said gearing drive (298) includes a sun gear (300) connected to said one tool body (288) for rotation therewith, a ring gear (314) connected to said other tool body (280) for rotation therewith, and intermediate gearing (310, 312) drivingly engaging said sun (300) and ring gears (314) mounted to a carrier (306) and means (318, 320) fixing said carrier (306) against rotation upon mounting of said tooling assembly (10) into said spindle assembly (12).

14. The tool coupling arrangement according to claim 13 wherein said means for fixing said carrier (306) comprises a stationary reaction pin (318) attached to housing portions (62) of said spindle assembly (101) and engaging said carrier (306) upon mounting of said tooling assembly (10) into said spindle assembly (12).

15. The tool coupling arrangement according to claim 14 further including a locking element (326) moveable to a position locking together said inner and outer tool bodies (288, 280) and bias means (328) urging said locking element (326) to said position; and wherein said stationary reaction pin (318) is engageable with said locking element (326) to move said locking element (320) out of said position upon mounting of said tooling assembly (10) into said spindle assembly (12).

* * * * *